Patented Mar. 28, 1950

2,502,145

UNITED STATES PATENT OFFICE 2,502,145

COMPOSITIONS OF PHENOL-OIL CONDENSATES AND POLYEPOXIDES

Sylvan Owen Greenlee, Racine, Wis., assignor to Devoe & Raynolds Company, Inc., Louisville, Ky., a corporation of New York No Drawing. Application November 5, 1946, Serial No. 707,991

8 Claims. (Cl. 260—18)

This invention relates to new products and compositions resulting from the reaction of complex epoxides with phenol-oil condensates in regulated proportions to give valuable compositions which are useful in the manufacture of varnishes, molded compositions and articles, etc. The invention includes initial reaction mixtures or compositions containing the complex epoxides and the phenol-oil condensates as well as intermediate and final reaction products or compositions and methods for their production and articles and products made therefrom.

The complex epoxides used in making the new compositions are those derived from the reaction of polyhydric phenols with polyfunctional halohydrins and alkali or with polyepoxides in regulated proportions.

The phenol-oil condensates are polyhydric phenols, resulting from the condensation of two or more mols of a phenol with one mol of an unsaturated drying oil or with other unsaturated fatty acid esters of polyhydric alcohols, particularly triglyceride esters such as linseed oil, oiticica oil, tung oil, etc. When such unsaturated esters are condensed with phenols with the use of suitable condensing agents, a condensation reaction takes place with resulting attachment of the phenol to the oil through nuclear condensation at a double bond of the oil to form hydroxy aryl derivatives of the esters. Some condensation may take place between the phenolic hydroxyl group and the double bond to form ether derivatives but the main reaction is one of nuclear condensation to form polyhydric phenol derivatives of the esters.

According to the present invention such phenol-oil condensates are admixed with complex epoxides or are reacted with such complex epoxides to form new compositions suitable for reaction or for further reaction to form more complex reaction products and compositions.

One of the objects of the invention is the production of initial reaction mixtures or compositions containing such phenol-oil condensates and complex epoxides in proportions suitable for reaction by direct addition to form resins, drying compositions, films, molding compositions, etc.

Another object of the invention is the production of intermediate reaction products of such condensates and complex epoxides which are capable of further reaction to form insoluble, infusible products and the preparation of higher molecular weight and more complex compositions from such intermediate reaction products.

Another object of the invention is the production of films, articles, molded products, and other final reaction products of outstanding properties from such condensates and complex epoxides or from intermediate reaction products thereof.

Other objects of the invention will appear from the following more detailed description.

The phenol-oil condensates used in making the new compositions and products are condensation products of phenols with unsaturated fatty acid esters of polyhydric alcohols, particularly drying oil esters. Thus, by reacting phenol with drying oils such as linseed oil, China-wood oil and oiticica oil, which contain unsaturated double bonds in the ester groups, condensation products can be produced which are hydroxy aryl or phenol derivatives of the drying oil. Where two or more mols of a monohydric phenol are thus combined per mol of drying oil the phenol-oil condensates are polyhydric phenols or polyhydric phenol-oil condensates. Such phenol-oil condensates are formed when the condensation between the phenol nucleus and the double bond of the drying oil is effected in the presence of various catalysts, such as sulfuric acid, phosphoric acid, oxalic acid, etc.

The use of a small amount of phosphoric acid is advantageous in making phenol-oil condensates with the conjugated oils. With oils of lesser unsaturation a more active catalyst is advantageously used such as zinc chloride or aluminum chloride.

The proportions of phenol and unsaturated oil reacted to form the phenol-oil condensates should in general be such that a polyhydric phenol derivative is produced, thus giving a difunctional reactant for reacting with the complex epoxides. In general, in making the phenol-oil condensates a considerable excess of the phenol is advantageously used and the excess may be more or less completely removed by vacuum distillation at the end of the condensation reaction.

According to the present invention such phenol-oil condensates are reacted with complex epoxides at elevated temperatures or with the aid of suitable catalysts to produce reaction and condensation products which are valuable compositions for use in the manufacture of varnishes, molding compositions, adhesives, etc.

The complex epoxides used in making the new compositions are produced by the reaction of polyhydric phenols with polyfunctional halohydrins and alkali or with polyepoxides to form complex reaction products containing terminal epoxide groups. The production of such complex epoxides is described in my companion applications, Serial Nos. 617,176, filed September 18, 1945, 621,856, filed October 11, 1945, and 626,449, filed November 2, 1945.

In my companion application, Serial No. 626,449, I have described new polyepoxy products and compositions obtained by the direct addition of polyhydric phenols with polyepoxides and with the proportion of polyepoxides reacting with the polyhydric phenols in excess of the equivalent amount so that the resulting reaction products will contain terminal epoxy groups. Such polyepoxy reaction products and particularly complex polymeric polyepoxy reaction products are advantageously used for reaction with phenol-oil condensates to give the new compositions and products of the present invention.

In my companion application, Serial No. 617,176, I have described complex polymeric reaction products of polyhydric phenols with polyfunctional halohydrins such as epichlorohydrin and glycerol dichlorohydrin, with the difunctional chlorohydrin used in proportions in excess of that equivalent to the polyhydric phenol and less than twice the equivalent amount, by carrying out the reaction with the addition of caustic alkali equal to or somewhat in excess of the amount required to combine with the halogen of the halohydrin to give complex polymeric products containing terminal epoxy groups and terminal hydroxyl groups and with the epoxy groups in general considerably in excess of the terminal primary hydroxyl groups. Such complex polymeric epoxy-hydroxy products and compositions are advantageously used for reaction with phenol-oil condensates in making the new compositions and products of the present invention.

In my companion application, Serial No. 621,856, I have described the epoxy-hydroxy compositions resulting from the reaction of a polyhydric phenol with a polyfunctional halohydrin such as epichlorohydrin in approximate proportions of 2 mols of epichlorohydrin to 1 mol of dihydric phenol to give resinous products containing both terminal epoxy and hydroxy groups with the proportion of terminal epoxy groups considerably in excess of the terminal hydroxy groups. Such epoxy-hydroxy compositions are also advantageously used for reaction with the phenol-oil condensates to give the new compositions and products of the present invention.

Complex-epoxide-containing compositions can also be produced by the reaction of complex polyhydric phenols with polyfunctional halohydrins such as epichlorohydrin and glycerol dichlorohydrin, with the difunctional chlorohydrin used in proportions in excess of that equivalent to the polyhydric phenol; the polyhydric phenol being a complex polyhydric phenol derived from the reaction of a simple polyhydric phenol such as resorcinol, hydroquinone, and bisphenol (p,p'-dihydroxy-diphenyl dimethyl methane) with polyhalides which contribute no hydroxyl groups to the resulting composition, using the polyhydric phenol in proportions in excess of that equivalent to react with all of the halogen groups present in the polyhalide. Such complex epoxy-hydroxy products and compositions are also advantageously used for reaction with phenol-oil condensates to form the new compositions and products of the present invention.

The complex resinous epoxides which are reacted with the phenol-oil condensates are polymeric polyether derivatives of polyhydric phenols having alternating aromatic and aliphatic nuclei united through ether oxygen and having terminal epoxide groups and free from functional groups other than epoxide and hydroxyl groups.

Initial mixtures of the phenol-oil condensate and of the complex epoxide can be made by mixing the condensate and epoxide with heating or with the use of a solvent to give a homogeneous liquid composition. Thus, for example, the phenol-oil condensate and the complex epoxide may be separately dissolved in a common solvent and the solutions admixed using, e. g., methyl ethyl ketone as a solvent, e. g., in the form of 50% solutions. Such solutions may have a suitable catalyst added thereto to promote reaction between the condensate and complex epoxide using, e. g., sodium phenoxide, or diethylene triamine as a catalyst. Such solutions can be used directly as impregnating solutions or for coating purposes with subsequent heating to convert the products into the form of the final composition.

It is one advantage of the new compositions, when the phenol-oil condensates are made from highly unsaturated drying oils, which retain a considerable degree of unsaturation even after, e. g., 2 or 3 mols of phenol have been condensed per mol of drying oil, that the products still have drying properties and give resulting compositions which are oil modified compositions and products.

The reactions which take place between the phenol-oil condensate and the complex epoxide appear to be complex in nature. While I do not desire to limit myself by any theoretical explanation of the exact nature or mechanism of the reaction, it seems probable that the reaction is largely or primarily between an epoxide group of the complex epoxide and a phenolic hydroxyl of the phenol-oil condensate to form an ether linkage by direct addition. The complex epoxides may themselves contain free hydroxyl groups and reaction may take place during condensation or final hardening between epoxide groups of the compex epoxides and hydroxyl groups of the complex epoxides.

The proportions of complex epoxide and of phenol-oil condensate used will vary with different condensates and epoxides and with the nature of the product to be produced. In general, it is desirable and advantageous to use a sufficient amount of epoxide with sufficient epoxide groups to react with all of the phenolic hydroxyls of the phenol-oil condensate, or an excess of the epoxides. Where the complex epoxide is itself a polyepoxide, e. g., a diepoxide, it can react through both epoxide groups with phenol hydroxyls of the phenol-oil condensate to form more complex and high molecular weight condensation products.

It is sometimes advantageous to add a simple polyepoxide such as diglycide ether or diepoxy butane to the phenol-oil condensate and the complex epoxide to furnish additional epoxide groups for reacting with phenolic hydroxyls of the phenol-oil condensate and hydroxyl groups of the complex epoxides.

The reactivity of the different complex epoxides with phenol-oil condensates is somewhat dependent upon the type or structure and the equivalent weight of the epoxide composition. The equivalent weight, as used in referring to the complex epoxides, means the weight which is equivalent to one epoxide group, or the weight which is capable of entering into a reaction by direct addition with one hydroxyl group. The method used for determining the epoxide content or equivalent weight of the composition per epoxide group was by heating one gram sample of the epoxide composition with an excess of pyridine containing pyridine hydrochloride (made by adding 16 cc. of concentrated hydrochloric acid per liter of pyridine) at the boiling point for 20 minutes and back titrating the excess pyridine hydrochloride with 0.1 N sodium hydroxide using phenolphthalein as indicator, and considering that 1 HCl is equivalent to one epoxide group.

Usually the complex epoxides of low equivalent weight to epoxide groups are more highly reactive with the phenol-oil condensates than complex epoxides of higher equivalent weight to epoxide groups. In general, the complex epoxides advantageously contain more than one epoxide group per molecule and may advantageously contain an average of around one and a half or two epoxide groups per molecule. The complex epoxides are in general resinous in character. They may in some cases be liquid products, but for many practical purposes the resinous polyepoxides are solid at ordinary temperatures. The complex epoxy resins are soluble, unless too highly polymerized, in solvents such as acetone, methyl ethyl ketone, diacetone alcohol, cyclohexanone, etc.; and some of the complex epoxides of low melting point and low degree of polymerization are soluble in toluene.

Catalysts which can be used for bringing about or promoting the reaction of the complex epoxides with the phenol-oil condensates are alkaline catalysts such as aliphatic amines, sodium and potassium hydroxide and alkali phenoxides. Certain of the Friedel-Crafts type catalysts are also catalytic for these reactions. Boron trifluoride addition products or complexes which are stable or relatively stable at ordinary temperatures but which on the application of heat liberate boron trifluoride can be advantageously used. The latent type of boron trifluoride catalysts referred to are usually coordinated compounds of boron trifluoride with amines, amides, sulfides and the like. Likewise, certain diazonium salts may be prepared which contain boron trifluoride in a form which is not active at ordinary temperatures but decompose at higher temperatures to give boron trifluoride which catalyzes the polymerization or reaction through epoxide groups.

The final conversion of the composition made with the complex epoxides and phenol-oil condensates may be carried out with or without the use of solvents and with or without the use of plasticizers, depending on the final results desired.

In protective coating applications it is usually desirable to apply a product which is essentially a solid dissolved in a solvent, in which case it undergoes a preliminary drying by mere solvent evaporation, and the dry film may then be converted to an infusible, insoluble product on further heat treatment; and the compositions of the present invention are well adapted for this purpose.

On the other hand, when the compositions of the present invention are used to make molded objects, it is usually desirable to use a composition which contains no solvent, and in some cases a composition which may be used in a dry powdered form.

In still other applications, it is desirable to have a composition, containing no solvent, which is sufficiently liquid at a relatively low temperature to be used directly in the impregnation of wood and certain fabric materials.

The present invention provides a wide range of the reaction compositions and products including initial mixtures of phenol-oil condensates with complex epoxides as well as partial or intermediate reaction products of such initial mixtures and compositions containing such intermediate reaction products as well as final reaction products and compositions.

The complex epoxides as described in the above mentioned copending applications, may be of widely varying chemical structures and they may also have widely varying physical properties, for example, they may be liquid materials, or they may be solids melting at relatively low temperatures or even at high temperatures.

The new compositions can be modified by admixing other modifying agents such as other resins to obtain modified products.

The compositions of the present invention may be used without or with fillers and extenders of the inert type. For example, valuable enamels may be obtained by pigmenting the initial or intermediate compositions with the usual type of inert pigments used in the formulation of enamels and paints. It is also sometimes desirable to use such inert materials as wood flour or asbestos with the new compositions in the preparation of certain molded objects. For example, brake linings and clutch linings may be formulated from mixtures of asbestos type materials with the new compositions.

For certain applications such as the manufacture of certain resin-bonded grinding wheels it is desirable to introduce abrasive materials and other fillers into the compositions in which the resinous composition acts as a bonding material for the fillers and abrasives when the compositions are subjected to final hardening.

The invention will be further illustrated by the following specific examples but it will be understood that the invention is not limited thereto. The parts are by weight.

Examples I and II illustrate the preparation of phenol-oil condensates such as are used with the complex epoxides in forming the new compositions and products.

*Example I.*—A reaction mixture of 291 parts of China-wood oil, 200 parts of phenol and 5 parts of syrupy phosphoric acid (85%) was heated with continuous agitation for three hours and 50 minutes at a temperature of 190 to 200° C. The unreacted phenol was more or less completely removed by distillation at 5 mm. pressure with heating of the mixture to 150° C. with agitation. The increase in weight indicated that approximately 3.3 mols of phenol on the average had combined or condensed with each mol of China-wood oil.

*Example II.*—A phenol-oil condensate was prepared by heating a mixture of 306 parts of oiticica oil, 250 parts of phenol and 5 parts of syrupy phosphoric acid for three hours and 50 minutes at a temperature of 186–200° C. followed by removal of the excess phenol by vacuum distillation. The increase in weight after removal of the excess phenol showed that approximately 2.54 mols of phenol had combined on the average with each mol of oiticica oil.

Examples III, IV and V illustrate the preparation of complex epoxides to be used for reaction with phenol-oil condensates in making the new compositions. These examples are given by way of illustration, such complex epoxides being more fully described in the prior applications hereinbefore referred to.

*Example III.*—A complex epoxide was prepared by the reaction of 3 mols of resorcinol with 3.5 mols of epichlorhydrin in the presence of aqueous caustic alkali solution containing 3.6 mols of sodium hydroxide. This product softened at 86° C. (Durran's Mercury method) and had an equivalent weight per epoxide group of 1000.

*Example IV.*—A complex epoxide was prepared by treating 3 mols of bisphenol with 4 mols of epichlorhydrin in the presence of 5.2 mols of sodium hydroxide, giving a product which melted at 90° C. and had an equivalent weight per epoxide group of 730.

*Example V.*—A complex epoxide was prepared by heating 100 parts of the product of Example IV with 6 parts of bisphenol, taking 1 hour to go from 150 to 200° C. and holding at 200° C. for 1½ hours. This product melted at 130° C. and had an equivalent weight per epoxide of 1300.

The following examples illustrate the new compositions and products made with phenol-oil condensates and complex epoxides.

*Example VI.*—A mixture of 100 parts by weight of the phenol-oil condensate of Example II above (from phenol and oiticica oil) and 100 parts of the complex epoxide of Example IV above was dissolved in methyl ethyl ketone to form a 50% solution and 5 parts of diethylene triamine was added to the solution. The resulting varnish when spread as a film of .003 inch thickness was dried and baked for 40 minutes at 150° C. and gave a hard, flexible, clear product.

*Example VII.*—A 50% solution in methyl ethyl ketone was similarly made of 100 parts of the phenol-oil condensate of Example I (from phenol and China-wood oil) and 100 parts of the complex epoxide of Example V and 5 parts of diethylene triamine was added to the resulting solution. When the resulting varnish was spread in films of .003 inch thickness and the film was dried and baked for 45 minutes at 150° C. it gave a hard, flexible product.

*Example VIII.*—A 50% solution is methyl ethyl ketone was made of 33⅓ parts of the phenol-oil condensate of Example I and 100 parts of the complex epoxide of Example IV and 3 parts of sodium phenoxide was added to this solution as a catalyst. When the resulting varnish was formed into wet films of .003 inch thickness and the film dried and baked for 45 minutes at 150° C. it gave an exceedingly hard, tough, clear product.

*Example IX.*—A similar 50% solution in methyl ethyl ketone was made of 33⅓ parts of the phenol-oil condensate of Example II and 100 parts of the complex epoxide of Example IV and 3 parts of sodium phenoxide was added to the resulting solution as a catalyst. The resulting varnish when spread as a wet film of .003 inch thickness and baked for 45 minutes at 150° C. gave a very hard, tough, flexible product.

*Example X.*—A similar 50% solution in methyl ethyl ketone was made of 33⅓ parts of the phenol-oil condensate of Example I and 100 parts of the complex epoxide of Example III and 3 parts of sodium phenoxide was added to the resulting solution as a catalyst. When the resulting varnish was spread as a wet film of .003 inch thickness and baked for 45 minutes at 150° C. it gave a hard, tough, clear and fairly flexible product.

Products and compositions of varying properties can be produced by using varying proportions of the phenol-oil condensate and of the complex epoxide or by using different condensates and epoxides.

The new compositions are capable of admixture with various other resins in forming the final molding mixtures and can also be used for compounding with fillers in making molded articles or for impregnating paper, fabric, wood, etc., in making impregnated or coated or laminated articles.

I claim:

1. The method of producing new drying compositions which comprises reacting (1) phenol oil condensates resulting from the condensation of a monohydric phenol free from functional groups other than phenolic hydroxyl and a vegetable drying oil in the proportions of at least 2 mols of phenol to 1 mol of drying oil, and said condensate containing at least 2 phenolic hydroxyl groups and having drying properties and (2) complex resinous epoxides which are polymeric polyether derivatives of polyhydric phenols having alternating aromatic and aliphatic nuclei united through ether oxygen and having terminal epoxide groups and free from functional groups other than epoxide and hydroxyl groups, in the proportions of from about equal parts by weight of phenol oil condensates and of resinous epoxides to about 3 parts by weight of resinous epoxides to 1 part by weight of phenol oil condensates.

2. The method, according to claim 1 in which the reaction is carried out in the presence of a catalyst selected from the group which consists of alkaline catalysts and Friedel-Crafts catalysts.

3. The method according to claim 1 in which the reaction is promoted by heating the reaction mixture to a high temperature.

4. The method according to claim 1 in which the complex resinous epoxides result from the reaction of bisphenol and epichlorhydrin in the presence of an alkali.

5. A new drying composition in the form of a reaction mixture of (1) phenol oil condensates resulting from the condensation of a monohydric phenol free from functional groups other than phenolic hydroxyl and a vegetable drying oil in the proportions of at least 2 mols of phenol to 1 mol of drying oil, and said condensate containing at least 2 phenolic hydroxyl groups and having drying properties and (2) complex resinous epoxides which are polymeric polyether derivatives of polyhydric phenols having alternating aromatic and aliphatic nuclei united through ether oxygen and having terminal epoxide groups and free from functional groups other than epoxide and hydroxyl groups, in the proportions of from about equal parts by weight of phenol oil condensates and of resinous epoxides to about 3 parts by weight of resinous epoxides to 1 part by weight of phenol oil condensates.

6. A reaction mixture as defined in claim 5 which also contains a small amount of a catalyst selected from the group which consists of alkaline catalysts and Friedel-Crafts catalysts.

7. A reaction mixture as defined in claim 5, in which the reaction mixture is dissolved in a volatile organic solvent with a small amount of an alkaline catalyst.

8. A reaction mixture as defined in claim 5 in which the complex resinous epoxides result from the reaction of bisphenol with an excess of epichlorhydrin and alkali.

SYLVAN OWEN GREENLEE.

REFERENCES CITED

The following references are of record in the file of this patent:

UNITED STATES PATENTS

| Number | Name | Date |
|---|---|---|
| 1,887,833 | Byck | Nov. 15, 1932 |
| 2,059,260 | Long et al. | Nov. 3, 1936 |
| 2,131,120 | Schlack | Sept. 27, 1938 |

FOREIGN PATENTS

| Number | Country | Date |
|---|---|---|
| 579,698 | Great Britain | Aug. 13, 1946 |